United States Patent
Ni et al.

(10) Patent No.: US 6,640,261 B1
(45) Date of Patent: Oct. 28, 2003

(54) METHOD AND APPARATUS FOR SCHEDULER COUPLED TO MEMORY ARRAY WHEREIN SCHEDULER ADDRESSES ARRAY WITH AT LEAST A PORTION OF AN IDENTIFICATION NUMBER

(75) Inventors: Jie Ni, Beaverton, OR (US); Richard Reohr, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/428,600

(22) Filed: Oct. 27, 1999

(51) Int. Cl.[7] .............................. G06F 3/00; G06F 13/00
(52) U.S. Cl. ................ 710/6; 710/29; 710/33; 709/103; 709/232; 709/240; 712/217; 711/158
(58) Field of Search .............................. 710/33, 34, 52, 710/55, 36, 30, 29, 6; 711/114, 158; 709/103, 232, 236, 240; 712/217

(56) References Cited

U.S. PATENT DOCUMENTS 5,682,554 A * 10/1997 Harrell ..................... 710/57
5,974,523 A * 10/1999 Glew et al. ................ 712/23
6,463,484 B1 * 10/2002 Moss ......................... 710/36

OTHER PUBLICATIONS

"Time Map Scheduling", IBM Technical Disclosure Bulletin, Jun. 1, 1973, vol. 16, Issue 1, pp. 127–136.*

* cited by examiner

Primary Examiner—Jeffrey Gaffin
Assistant Examiner—Tammara Peyton
(74) Attorney, Agent, or Firm—Kenneth M. Seddon

(57) ABSTRACT

Briefly, in accordance with one embodiment of the invention, an apparatus includes an integrated circuit that has the capability to schedule transferring processes that have an individual identification number. At least a portion of each individual identification number is used to indicate the presence of each of the transfer processes. Briefly, in accordance with another embodiment of the invention, an integrated circuit having a scheduler of transfer processes, each of the transfer processes having an identification number. The scheduler is coupled to a memory array of bits, and a portion of each identification number is used as a portion of an address to the memory array of bits. Briefly, in accordance with yet another embodiment of the invention, a method of scheduling requests for the transfer of data where each request having an identification number. The identification number is used in addressing a bit in an array of bits and set to indicate the request for the transfer of data.

23 Claims, 3 Drawing Sheets

METHOD AND APPARATUS FOR SCHEDULER COUPLED TO MEMORY ARRAY WHEREIN SCHEDULER ADDRESSES ARRAY WITH AT LEAST A PORTION OF AN IDENTIFICATION NUMBER

BACKGROUND

This invention relates, in general, to computing networks, and more particularly, to scheduling the flow of information through a network.

As technology advances, the complexity and number of devices that are connected to computing or communication networks increases. This in turn increases the amount of information that is shared between the devices via the network. To reduce the number of connections employed, it is desirable to design the network so that the devices may share many of the same interconnect wires. By reducing the number of wires, the reliability and efficiency of the network is improved and the overall cost of the network is reduced.

To allow multiple devices to share the same connections, networks may include a scheduler to schedule the flow of information across the network. Various protocol mechanisms may be used by the scheduler to determine which device in the network is allowed to use a connection. This determination may be based in whole or part on the priority each device is given by the network. Conventionally, a scheduler may use a round-robin system to allow each device to have its turn sending or receiving information across the network. However, the use of a round-robin approach may be difficult to implement and inefficient given the priorities of a particular set of devices.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
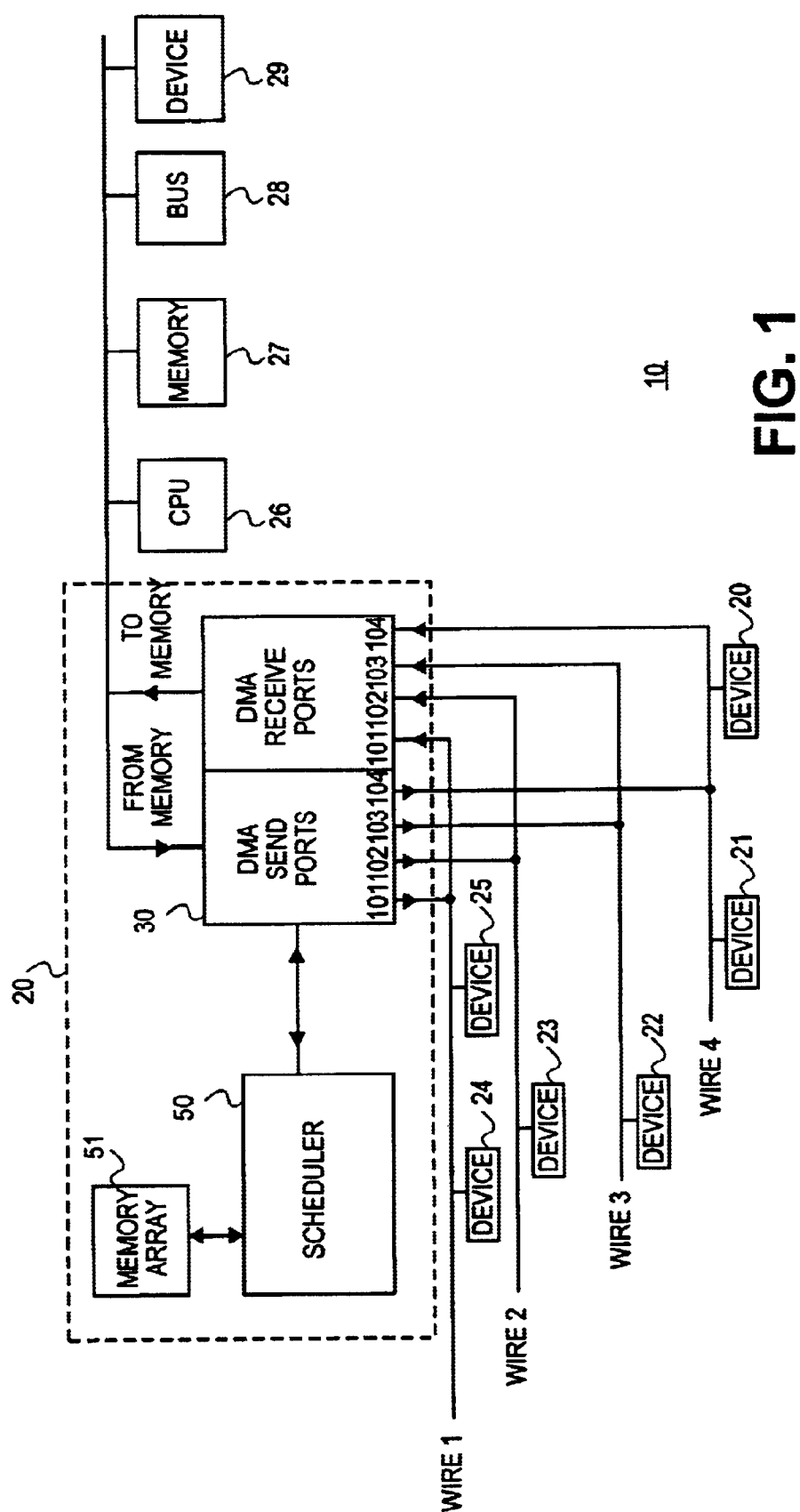
FIG. 1 is a block diagram representation of a portion of a system having a scheduler in accordance with an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description which follow are presented in terms of algorithms and symbolic representations of operations on data bits or binary digital signals within a computer memory. These algorithmic descriptions and representations are the techniques used by those skilled in the data processing arts to convey the substance of their work to others skilled in the art. An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise, as apparent from the following discussions, it is appreciated that throughout the specification discussions utilizing terms such as "computing" or calculating" or "determining" or the like, refer to the action of a computer or computing system, or similar electronic computing device, that manipulates and transforms data represented as physical (electronic) quantities within the computing system's registers and/or memories into other data similarly represented as physical quantities within the computing system's memories, registers or other such information storage, transmission or display devices.

FIG. 1 is a block diagram representation of a portion of a system 10 in accordance with just one embodiment of the present invention. System 10 represents a network comprising various devices 20–29 that are connected together. However, it should be understood that the present invention may have application to not just macro-networks as shown in FIG. 1, but may also be applicable to micro-networks. Examples of micro-networks would include microcontrollers, microprocessors, integrated circuits, and the like, where information is exchanged between modules within the micro-network across a bus or similar communication path.

As illustrated in FIG. 1, system 10 may include an integrated circuit 20 that is used to transfer data between devices 20–29. In this embodiment, integrated circuit 20 includes a scheduler 50 and Direct Memory Access (DMA) controllers 30 and 31. However, it should be understood that integrated circuit 20 may include other modules such as a microprocessor, memory array, and the like. Furthermore, in alternative embodiments of the present invention, system 10 and integrated circuit 20 may be implemented using multiple integrated circuits.

Simply stated, scheduler 50 functions in cooperation with DMA's 30—31 to control the flow of data transfers within system 10. Each of DMA's 30–31 may have a number of ports 101–104 that are each connected to wires 1–4, respectively. However, it should be understood that the use of wires 1–4 is only illustrative and it is not necessary that data transfers in accordance with the present invention be limited to transfers over wire.

Ports 101–104 of DMA 30 are used to transfer data from devices 26–29 to devices 20–25. Similarly, DMA 31 is used to transfer data from devices 20–25 to devices 26–29. Wires 1–4 are used, at least in part, to transfer data to and from devices 20–29, and the sequencing of the flow of data is determined by scheduler 50. Of course, the present invention is not limited in scope to this particular configuration as the number of ports and wires may be adjusted as the customer desires.

In this context, a transfer of data or signal information from one device to another is referred to as a transfer process. Although the present invention is not limited in scope in this respect, data may be transmitted and received throughout system 10 using the protocol defined in the Wekiva Architecture: Link Specification, version 0.9, dated Jul. 15, 1999, available from Intel Corp., Santa Clara, Calif.

It should be understood that the present invention may also have application in a variety of other system configurations. For example, devices 20–25 and 29 may be a variety of user or system components that are coupled to system 10. For example, devices 20–25 and 29 may comprise without limitation printers, monitors, disk drives, scanners, memory storage units, microprocessors, microcontrollers, caches, storage farms, fabric managers, switches, routers, application software, system software, any input/output (I/O) device, or the like.

In addition, as shown in the embodiment illustrated in FIG. 1, system 10 may include specific devices such as a microprocessor 26, a memory device 27, or a bus 28 in communication with another network. However, it should be understood that it is not necessary for system 10 to have all or any of these devices 20–29 in order to appreciate the benefits of this embodiment of the present invention. It is possible for system 10 to have just one of devices 20–29 or a few, or other devices.

Figure 2:
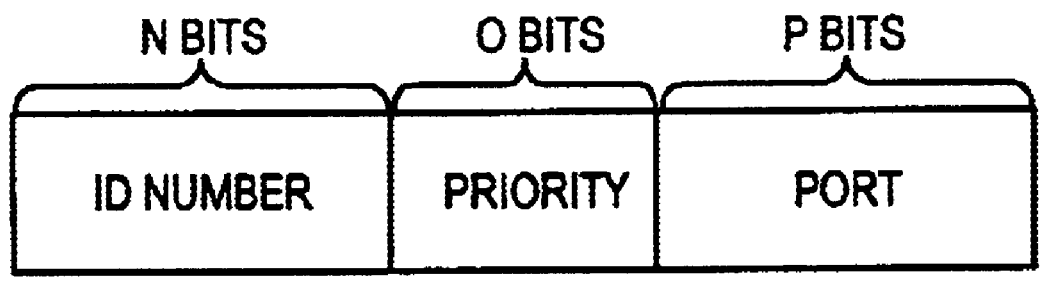
FIG. 2 is a block representation of a memory array of bits in accordance with an embodiment of the present invention.

In this particular embodiment of the present invention, a request to transfer data may begin with devices 20–29 creating an identification number that contains signal information related to the type and origin of the request. FIG. 2 is an example of a transfer process identification number 200 that may be used in accordance with this embodiment of the present invention. It should be understood by those skilled in the art that the transfer process identification number may also be referred to as a virtual interface (VI) number or simply an ID number.

If a device 20–29 needs to transfers data, it generates an identification number 200 that provides, in this embodiment, the identity of the device, the priority of the request, and the port to be used for the transfer. Of course, other information may be included. These various portions are illustrated in FIG. 2. It should be understood that the scope of the present invention is not limited to this embodiment and it is not necessary that the identification number include all of this information. For example, an embodiment of the present invention may be used in a system that does not have a priority system or only has one port for communication. In such applications, the identification number may only designate the device making the transfer request, although this is just one example.

Since multiple devices within system 10 may have a request to transfer data (e.g., a transfer process), scheduler 50 determines which device is permitted to use DMA's 30–31 in order to prevent multiple devices from communicating at substantially the same time. To do this, a memory array 51, in this embodiment, is used to record when a device has generated a process to transfer data. Memory array 51 comprises an array of bits arranged in rows and columns that may be located either within scheduler 50 or externally to scheduler 50 and integrated circuit 20. Furthermore, memory array 51 may be implemented in a variety of ways including, but not limited to, as a static random access memory (SRAM), as a dynamic random access memory (DRAM), as a non-volatile memory, as a disk drive, or the like.

When scheduler 50 receives a transfer process request having an individual identification number, all or a portion of the digital values of the individual identification number are used to address memory array 51. Thus, a portion of the transfer process identification number is used to address each bit in memory array 51. In this embodiment, each location in memory array 51 comprises a bit that that is set to indicate when scheduler 50 has received a transfer process request with that particular identification number. Devices 20–29 generate a unique identification number. The bit within memory array 51 may be used to represent the request for a transfer process.

Figure 3:
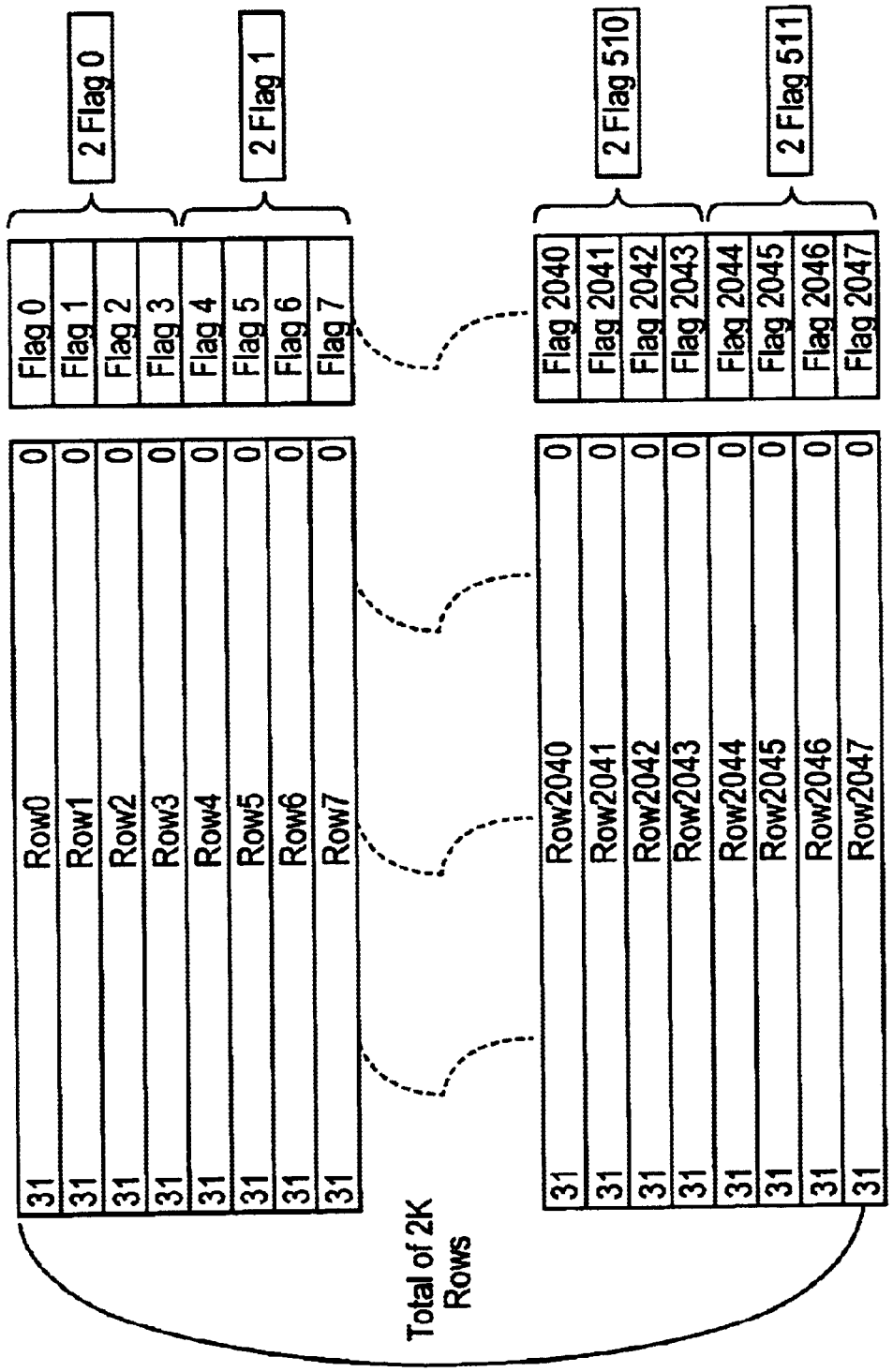
FIG. 3 is an illustration of an identification number that may be used in accordance with various embodiments of the present invention.

For example, if system 10 is capable of handling 64K identification numbers, then memory array 51 comprises 64K bits that indicate when a transfer process having each individual identification number has been received by scheduler 50. The actual configuration of rows and columns may be varied to improve the efficiency and speed of scheduler 50. One example of how memory array 51 may be arranged is illustrated in FIG. 3. As shown, memory array 51 may comprise 2K rows with each row having 32 columns. Thus, if the identification number of each transfer process comprises 16 bits, then eleven (11) of the bits may be used to determine which row is selected and five (5) bits may be used to determine the column within the row. Of course, the scope of the present invention is in no way limited to this particular configuration. In general, if the identification number contains N bits, then memory array 51 may comprise at least $2^X$ rows and $2^{(N-x)}$ columns. It should also be understood that in alternative embodiments, it is not necessary that each transfer process number have a designated location in memory array 51 and the number of memory locations within memory array 51 can be greater than, equal to, or less than the number of possible transfer process numbers.

Once the appropriate bit or bits within memory array 51 have been set to indicate the presence of transfer process requests of the devices 20–29 within system 10, scheduler 50 determines which of the requests is given the next opportunity to communicate. One method of determining the next request would be to begin searching each location of memory array 51 until a bit that has been set is found. However, this may not be the most efficient technique if memory array 51 is relatively large and includes few transfer process requests because a lot of time may be wasted polling bits that do not indicate the presence of a transfer process request.

To address this problem, the searching of memory array 51 for processes may be expedited with the use of flags. A flag may be set to indicate that at least one of the bits contained within a sub-portion of memory array 51 has been set. In the embodiment shown in FIG. 3, a flag (labeled Flag0–Flag2047) is used to indicate if any of the bits in that particular row, (e.g., rows 0–2047, respectively) have been set. If scheduler 50 has not received a transfer process request corresponding to the bit locations of a given row, then the flag for that row will not be set to indicate that there is no need to search that particular row for transfer process requests. Such an arrangement may provide for a binomial search of memory array 51.

It may also be desirable to use additional levels of flags that partition memory array 51 into larger sections to further expedite the searching of memory array 51. As shown in FIG. 3, a second set of flags (labeled 2Flag0–2Flag511) may be employed where each of the second set of flags is used to indicate if any of the first set of flags (Flag0–Flag2047) has been set. For example, the second set of flags may indicate if one of four rows of memory array 51 has a bit that has been set. For example, 2Flag0 is set if any of flags Flag0–Flag3 have been set and so on. The use of multiple levels of flags provides for polynomial searching of memory array 51. However, it should be understood that the use of any flags or multiple levels of flags is not necessary for an embodiment of a system to fall within scope of the present invention.

In the embodiment illustrated in FIG. 1, only a portion of the identification number is used by scheduler 50 to determine the sequencing of transfer process requests from devices 20–29. Consequently, additional schedulers may be desired to control the flow of transfer process requests for the ports of system 10 and for the priority levels used within system 10. Thus, in alternative embodiments of the present invention, the system may have multiple schedulers dedicated for each port and priority. Alternatively, one scheduler may be multiplexed. In addition, it may be desirable to use all or a portion of the port and priority bits of the identification number 200 (see FIG. 2) to address memory array 51.

By now it should be appreciated that one embodiment of the present invention provides a system having a scheduler that may be used to control, at least in part, data transfers between devices. By using all or a portion of the identification number of a transfer process request to map a memory array, the need to maintain a FIFO system to determine the next transfer to be processed has been obviated. Furthermore, an embodiment of the present invention may include the use of flags to further improve the efficiency of the scheduler in determining the next transfer to be performed. Such improvements may increase the efficiency of the network and reduce its cost as well.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus comprising: at least one integrated circuit;
the integrated circuit including the capability, either alone or in combination with other integrated circuits, to schedule transferring of a plurality of transfer processes, at least some of the plurality of transfer processes having an individual identification number, wherein the integrated circuit is adapted to use at least a portion of an individual identification number directly as at least part of an address to an array of bits to indicate the presence of at least one of the plurality of transfer processes.

2. The apparatus of claim 1, wherein each individual identification number comprises at least N bits, and the array of bits comprises at least $2^x$ rows and $2^{(N-x)}$ columns.

3. The apparatus of claim 2, wherein N is 16.

4. The apparatus of claim 3, where in x is 5.

5. The apparatus of claim 2, and further comprising a first set of flags, wherein each of the first set of flags is capable of indicating if a portion of the array of bits indicates the presence one of the plurality of transfer processes.

6. The apparatus of claim 5, and further comprising a second set of flags, wherein each of the second set of flags is capable of indicating if a sub-set of the first set of flags indicates the presence of a portion of the plurality of processes.

7. The apparatus of claim 6, wherein the first set of flags and the second set of flags are capable of providing a polynomial search of the array of bits.

8. The apparatus of claim 1, wherein the apparatus is a computing network including at least a first device and a second device, and each of the plurality of transfer processes represents a request from the first device for a transfer of data to the second device.

9. The apparatus of claim 8, wherein the first device is selected from the group consisting of a memory storage unit, a printer, a microprocessor, a microcontroller, a monitor, and a cache.

10. An integrated circuit comprising a scheduler of transfer processes, each of the transfer processes having an identification number, wherein the scheduler is coupled to an array of bits, and wherein at least a portion of each identification number is directly used as at least a portion of an address to the memory array of bits.

11. The integrated circuit of claim 10, wherein each of the bits in the array of bits is capable of indicating the presence of a transfer process.

12. The integrated circuit of claim 10, and further comprising a first set of flags for indicating if a sub-portion of the memory array of bits indicates the presence of a transfer process.

13. The integrated circuit of claim 12, wherein the first set of flags is capable of providing a binomial search of the memory array of bits.

14. The integrated circuit of claim 12, and further comprising a second set of flags for indicating if a sub-portion of the first set of flags indicates the presence of a transfer process in a sub-portion of the memory array of bits.

15. The Integrated circuit of claim 14, wherein the first set of flags and the second set of flags are capable of providing a polynomial search of the memory array of bits.

16. The integrated circuit of claim 10, wherein each identification number comprises at least N bits and the memory array of bits comprises at least $2^x$ rows and $2^{(N-x)}$ columns.

17. A system comprising:

a scheduler;

the scheduler being adapted to determine priority for a plurality of transfer processes with an identification number associated with at least some of the plurality of transfer processes, wherein the scheduler is adapted to use at least a portion of the identification number to directly address a bit in an array of bits.

18. The system of claim 1, wherein each bit in the array of bits is adapted to indicate the presence of a transfer process.

19. The system of claim 18, and further comprising a first device and a second device, wherein each transfer process represents a request to transfer data from the first device to the second device.

20. A system comprising:

a scheduler that determines priority for a transfer process, the transfer process represented by an identification number; and a memory array coupled to the scheduler, wherein the scheduler is capable of addressing the memory array with at least a portion of the identification number.

21. The system of claim 20, and further comprising a plurality of devices and a plurality of ports for directing the flow of the transfer process between the plurality of devices, and wherein the identification number has a first portion adapted to indicate which of the plurality of devices originated the transfer process and a second portion that is adapted to indicate which of the plurality of ports is to be used for the transfer process.

22. The system of claim 21, wherein the identification number has a third portion adapted to indicate the priority of the transfer process.

23. The system of claim 22, and further comprising a plurality of schedulers adapted to determine priority for each of the plurality of ports.

* * * * *